Aug. 5, 1958 W. S. ELLIOTT 2,846,572

FREQUENCY MODULATION TRANSCEIVER WITH COMBINED FREQUENCY CONTROL

Filed April 23, 1956

INVENTOR.
WILLIAM S. ELLIOTT
BY
Moody and Goldman
ATTORNEYS

United States Patent Office 2,846,572

Patented Aug. 5, 1958

2,846,572

FREQUENCY MODULATION TRANSCEIVER WITH COMBINED FREQUENCY CONTROL

William S. Elliott, Cedar Rapids, Iowa, assignor to Collins Radio Company, Cedar Rapids, Iowa, a corporation of Iowa Application April 23, 1956, Serial No. 580,073

2 Claims. (Cl. 250—13)

Figure 1:
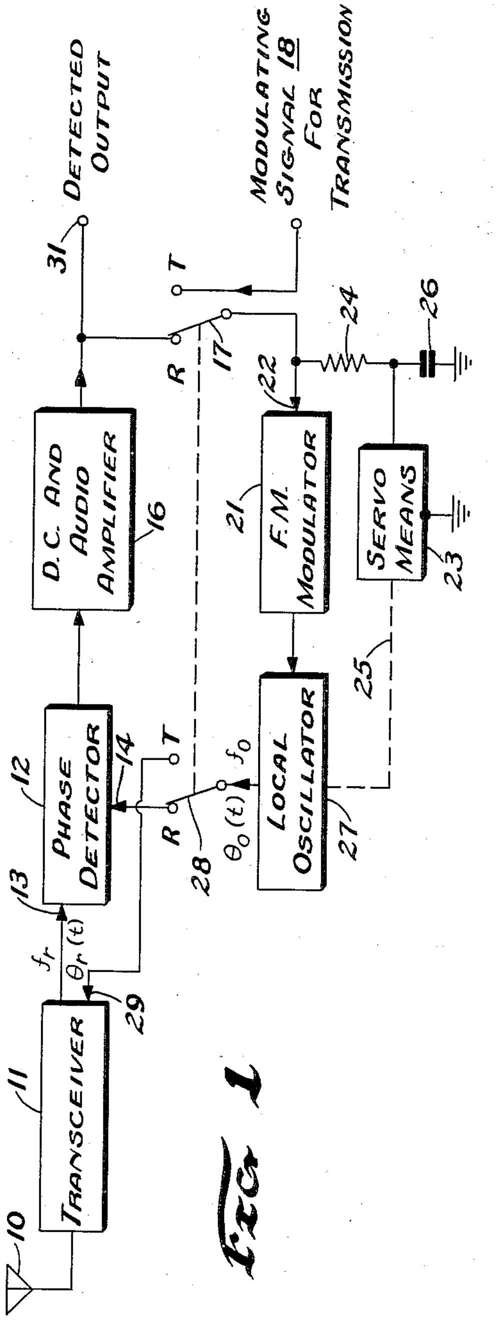

This invention relates to a novel means for detecting frequency-modulated waves, which includes as one of its attributes means for generating frequency modulated waves.

The detection system provided by the invention includes a local oscillator, which also can be used as a generation source for radio waves, that may be transmitted on the same carrier frequency as the received wave.

It is, therefore, an object of this invention to provide a novel means for detecting frequency-modulated waves.

It is another object of this invention to provide novel means for detecting frequency-modulated waves, wherein the detector remains aligned with the incoming signal regardless of temperature variation.

It is still another object of this invention to provide a novel detector of frequency modulated waves, which will maintain its alignment with the center frequency of a received F M signal, although the center frequency of the received signal shifts from time-to-time.

It is a further object of this invention to provide combined frequency detection and generation means for use in a transceiver of frequency-modulated signals to enable alignment of its transmitted carrier frequency with a received carrier frequency.

This invention utilizes a phase detector which receives as one of its inputs an incoming frequency-modulated signal, which may previously have been heterodyned down in frequency. The other phase-detector input is an internally-generated signal, which is the result of a feedback loop that starts at the detected output of the phase-detector.

The feedback loop includes a frequency-modulator and a local oscillator. The frequency-modulator has its input connected in series with the detected output of the phase detector; and the local oscillator is connected to the output of the modulator. The modulator provides reactive current to the oscillator in response to the detected modulating signal to frequency-modulate the output of the local oscillator, which provides the second input to the phase detector.

The bandwidth detectable with the invention is determined by the combined sensitivity of the phase detector and frequency modulator. This sensitivity can be increased to permit the detection of greater bandwidth by the serial addition of an amplifier in the feedback loop.

The invention provides a direct-current component in the output of the phase detector which is proportional to the difference between the center-frequency of the received frequency-modulated signal and the free-running frequency of the local oscillator. This D. C. component can be permitted substantial variation without deteriorating the quality of the output of the invention.

However, the D. C. component is utilized by the invention to maintain substantial alignment between the free-running frequency of the local oscillator and the center frequency of the incoming FM signal. The alignment may be done manually by observing an ammeter connected serially with the output of the phase detector, followed by manual adjustment of the local oscillator until zero D. C. voltage is registered on the ammeter.

In some practical cases, the variation in alignment will occur at too fast a rate for accurate manual alignment. Then, a servo device may be utilized to automatically align the frequency of the local oscillator to the incoming frequency. In this case, the direct current output of the phase detector is provided as the input to the servo means, and the servo means adjusts the local oscillator frequency for a zero direct-current condition at the output of the phase detector.

Figure 2:
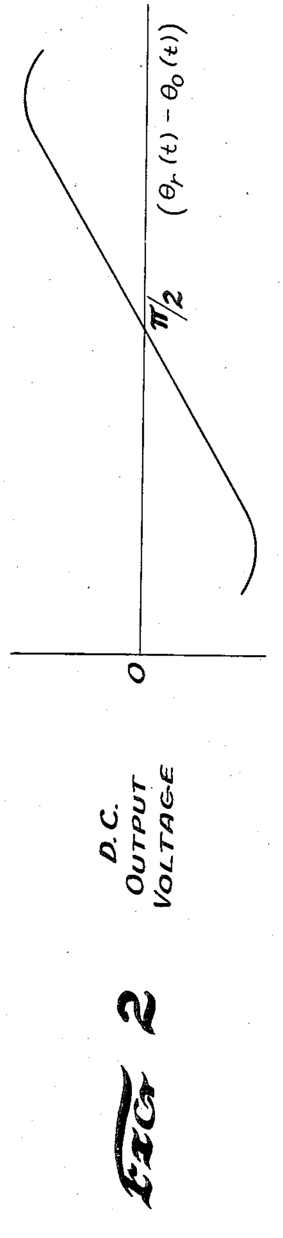

Further objects, features and advantages of this invention will be apparent to a person skilled in the art upon further study of the specification and drawings, in which:

Figure 1 is a schematic diagram of an illustrative embodiment of the invention; and, Figure 2 represents a transfer characteristic of a phase detector utilized by the invention.

Now referring to the invention in more detail, Figure 1 shows it used with a transceiver frequency scheme, wherein the system detects and transmits frequency-modulated waves.

Figure 1 includes an antenna 10 which may be used both for receiving and transmitting frequency-modulated carrier frequencies.

A transceiver 11 of conventional type has its input connected to antenna 10. Transceiver 11 includes a single oscillator system for both the generation of transmitted waves and the heterodyning received waves. Such single oscillator systems are well known, and therefore, are not explained herein.

The invention provides a phase detector 12, which has one input 13 connected to the output of the last intermediate-frequency stage in transceiver 11. Phase detector 12 also receives a second input 14, which is described below.

A direct-current and audio amplifier 16 has its input connected to the output of phase detector 12. A single-pole double-throw switch 17 has one contact R connected to the output of amplifier 16. Its other contact T is connected to a source of modulating signal 18, which may be used to modulate a carrier-wave transmitted from transceiver 11.

A frequency-modulator 21 has its input 22 connected to the pole of switch 17.

A servo means 23 also is connected to switch 17 through a resistor 24. A capacitor 26 is connected across the input of servo means 23. Resistor 24 and capacitor 26 provide a low-pass filter to the input of servo means 23. Where the detected output is an audio signal, the low-pass filter should have a time-constant that provides a cut-off frequency just below the audio frequency band.

A local oscillator 27, which has an output frequency $f_0$, is connected to the output of frequency-modulator 21. Output frequency $f_0$ is frequency-modulated by the operation of modulator 21 in response to the detected output of phase detector 12.

Nevertheless, the oscillator's free-running frequency $f_1$ is controlled by the output 25 of servo means 23, which for example, might mechanically control the setting of a trimmer capacitor (not shown) within local oscillator 27.

A second single-pole double-throw switch 28 has its pole connected to the output of local oscillator 27. Switch 28 has one contact R connected to the second input 14 of phase detector 12 and has a second contact T connected to the transmitting input 29 of transceiver 11. The poles of switches 17 and 28 are interlocked.

The detected output of the system is provided at a terminal 31 connected to the output of amplifier 16.

The following explanation of operation will assume, for clarity, that servo means 23 is disconnected from the system.

When switches 17 and 28 are in receive position R, input 13 to phase detector 12 receives a frequency-modulated wave of instantaneous frequency $f_r$, which may be represented in angular form as $\theta_r(t)$. Furthermore, the second input 14 to phase detector 12, which is provided by local oscillator 27 has an instantaneous frequency $f_0$ which may be represented in angular form as $\theta_0(t)$. Therefore, the output voltage V of phase detector 12 may be represented within its linear range of operation by the following expression:

$$V \approx A\left[\frac{\pi}{2} - \{\theta_0(t) - \theta_r(t)\}\right] \qquad (1)$$

wherein A is a proportionality constant having dimensions of volts per radian. The constant A represents the sensitivity of phase detector 12; and when amplifier 16 is included in the system, constant A also includes the gain of amplifier 16.

Accordingly, Expression 1 is an assumption which holds for a linear portion of the output characteristic of phase detector 12. This output characteristic is shown in Figure 2; and it is there noted that a substantial linear portion exists on both sides of the zero output voltage value, obtained when the input voltages have a $$90° \left(\frac{\pi}{2}\right) \text{ phase difference}$$

The output frequency $f_0$ of local oscillator 27 may also be represented mathematically as follows:

$$f_0 = f_1 + KV = f_1 + KA\left[\frac{\pi}{2} - \{\theta_0(t) - \theta_r(t)\}\right] \qquad (2)$$

where $f_1$ is the free-running frequency of local oscillator 27 which is obtained when it is oscillating without any feedback control, V is as defined above, and K is the sensitivity of the frequency-modulator 21. K will have dimensions of frequency. The latter portion of Expression 2 is obtained by direct substitution from Expression 1.

Expression 2 may be differentiated, and it will then provide the following expressions:

$$\frac{df_0}{dt} = 2\pi KA(f_r - f_0) \qquad (3)$$

Also:

$$f_r = f_c + \Delta f \cos W_m t \qquad (4)$$

where $f_r$ is the instantaneous frequency of the received frequency-modulated signal, $f_c$ is the center frequency of the received signal, $\Delta f$ is its frequency deviation, $W_m$ is $2\pi$ times the modulating frequency, and $t$ is time.

Expression 3 may be rewritten in the following differential equation form:

$$\frac{df_0}{dt} + af_0 = af_r \qquad (5)$$

where $a$ is the overall sensitivity of the feedback network and is defined:

$$a = 2\pi KA \qquad (6)$$

Differential Equation 5, after substituting Equation 4, provides the following solution, when integrated between the time limits 0 and $t$.

$$f_0 = C_1 e^{-at} + f_c(1 - e^{-at}) + \frac{a\Delta f}{a^2 + W_m^2} = (a \cos W_m t + W_m \sin W_m t - ae^{-at}) \qquad (7)$$

where $C_1$ is the constant of integration which will be evaluated later.

Now, the solutions for $\theta_0(t)$ and $\theta_r(t)$ may be obtained:

$$\theta_0(t) = 2\pi \int_0^t f_0 dt \qquad (8)$$

and after integration:

$$\theta_0(t) = \frac{2\pi C_1}{a}(1 - e^{-at}) + 2\pi f\left(t + e^{-at} - \frac{1}{a}\right) + \frac{2\pi\Delta f a}{a^2 + W_m^2}\left(\frac{a}{W_m} \sin W_m t - \cos W_m t + e^{-at}\right) \qquad (9)$$

and:

$$\theta_r(t) = 2\pi \int_0^t f_r dt \qquad (10)$$

which may be solved, since the frequency-modulated received signal $f_r$ is $$\theta_r(t) = 2\pi f_c t + \frac{2\pi\Delta f}{W_m} \sin W_m t \qquad (11)$$

The terms $e^{-at}$ represent transient effects which occur for a very short period of time, when the feedback loop is properly designed. The transients exist for a period of time that is required for the feedback loop to change the oscillator output frequency $f_0$ from its free-running frequency $f_1$ to the received frequency $f_r$.

When time $t$ is large, the transient terms ($e^{-at}$) in the above equations approach zero; and, therefore, the phase difference, sensed by the phase detector under steady state conditions, may be represented as follows:

$$\{\theta_0(t) - \theta_r(t)\} = \frac{2\pi C_1}{a} = \frac{2\pi f}{a} + \frac{2\pi\Delta f a}{a^2 + W_m^2}\left(\frac{a}{W_m} \sin W_m t - \cos W_m t\right) - \frac{2\pi\Delta f}{W_m} \sin W_m t \qquad (12)$$

If the feedback circuit is designed so that its overall sensitivity constant $a$ is very much greater than the highest modulating frequency $W_m$, Expression 12 reduces to the following form:

$$\{\theta_0(t) - \theta_r(t)\} \approx \frac{2\pi}{a}(C_1 - f_c - \Delta f \cos W_m t) \qquad (13)$$

Then, the constant of integration $C_1$ may be evaluated utilizing Expressions 13 and 2; and it is found that:

$$C_1 = \frac{a}{4} + f_1 \qquad (14)$$

After substituting Expression 14 into Expression 13, and substituting Expression 13 into Expression 1, it is found that the phase-detector output may be expressed as follows:

$$V = \frac{1}{K}(f_c - f_1 + \Delta f \cos W_m t) \qquad (15)$$

If the center frequency $f_c$ and the free-running oscillator frequency $f_1$ are constant, these components in Expression 15 will provide a direct-voltage component for detected voltage V, and the component $\Delta f \cos W_m t$ is directly proportional to the modulation. Thus, Equation 15 may be further represented in the following final form:

Detected output=D. C. component+modulation (16)

Hence, the D. C. component in the output is proportional to the difference between the center frequency of the received signal and the free-running frequency of the local oscillator. Thus, an ammeter may be placed serially in the feedback loop to detect the D. C. component; and the local oscillator may be adjusted from its reading until there is zero D. C. component provided from the phase detector. Then, the local oscillator frequency will be aligned with the center frequency of the received FM signal.

However, in Figure 1, the alignment of local oscillator 27 is done automatically by servo means 23, which receives the D. C. component as its input. Output 25 of servo means 23 accordingly adjusts the free-running frequency $f_1$ of local oscillator 27 until no D. C. component exists in the feedback loop. Consequently, the free-running frequency of local oscillator 27 is aligned with the center frequency $f_c$ of the received frequency-modulated signal.

D. C. and audio amplifier 16 improve the linearity of the detection system. The gain factor of amplifier 16 in effect increases the sensitivity A of phase detector 12. It is noted that Equation 13 above contains the assumption that the overall feedback sensitivity $a$ is much greater than the highest modulating frequency $W_m$ to obtain linear operation of the system. Since the gain of amplifier 16 increases A, it also increases $a$. Accordingly, the substantially undistorted detected bandwidth may be increased by increasing the gain of amplifier 16. However, a limiting point to maximum overall feedback sensitivity is reached when it causes sustained oscillation. Therefore, a proper design of the feedback loop will optimize the sensitivity $a$ at a point below its value which causes sustained oscillation.

Since servo means 23 aligns the free-running frequency of local oscillator 27 with the center frequency of the received FM signal, the output frequency of local oscillator 27 may be used as a source for a transmitted carrier wave. It may be added within transceiver 11 to the same frequencies that were used to heterodyne the received wave, in order to generate an output-carrier wave having the same frequency as the received carrier wave at antenna 10.

If during reception, the center frequency of the received FM wave should vary somewhat, the invention is self-correcting with servo means 23, since the servo means causes the local oscillator frequency to follow changes in the received carrier frequency. Consequently, it maintains the operation of phase detector 12 about the zero value of its output, which is the most linear part of the phase-detector transfer characteristic.

Also, if any temperature variation causes the free-running frequency $f_1$ of local oscillator 27 to shift, servo means 23 will correct the frequency $f_1$ of local oscillator 27 to compensate for temperature variation. Variation of oscillator frequency $f_1$ by temperature variation causes a D. C. component at the phase-detector output. As a result, servo means 23 regulates the free-running frequency $f_1$ of local oscillator 27 to provide a zero D. C. component which compensates for such frequency drift.

When switches 17 and 28 are in transmit position T, a source of modulation which might for example be provided from a microphone (not shown) is provided to the input 22 of FM modulator 21. Since such a modulating signal has no D. C. component, it will not affect servo means 23; otherwise, servo means 23 should be disconnected during transmit conditions. FM modulator 21 will then modulate local oscillator 27, and transceiver 11 heterodynes its frequency to the desired output carrier frequency at antenna 10.

It is desirable that the feedback loop have negligible phase-shift (that is negligible delay) with respect to the highest desired modulating frequency. Accordingly, the low-pass filter that is ordinarily provided at the output of a phase-detector must be designed with regard to its delay characteristics.

While particular forms of the invention have been shown and described, it is to be understood that the invention is capable of many modifications. Changes, therefore, in construction and arrangement may be made without departing from the scope of the invention as given by the appended claims.

What we claim is:

1. Means for detecting and transmitting frequency-modulated carrier signals, wherein the transmitted carrier frequency is aligned with the received carrier frequency, comprising a phase detector having a pair of inputs, with one input receiving said frequency-modulated signal for their detection, direct current and audio amplifier means having its input connected to the output of said phase detector, a first single-pole double-throw switch having a normally-closed contact connected to the output of said amplifier, a modulating signal source connected to the other contact of said first switch, servo means having its input connected in series with said first switch, a frequency modulator also having its input connected in series with said first switch, a local oscillator having an input connected to the output of said frequency modulator, the output of said local oscillator being frequency modulated in response to the output of said phase detector, the output of said servo means also connected to said local oscillator to adjust it for a condition of zero direct-current provided from the output of said phase detector, a second single-pole double-throw switch having its pole connected to the output of said local oscillator, with the normally-closed contact of said second switch connected to the other input of said phase detector, and said transmitting means being connected to the other contact of said second switch.

2. Means for detecting and transmitting frequency-modulated signals including transceiver means for receiving and transmitting said frequency-modulated signals, a phase detector having a pair of inputs, with one input connected to the output of said transceiver to obtain said received signals, amplifier means connected to the output of said phase detector, a frequency modulator having its input connectable in series with the output of said amplifier, a modulating source, means for sequentially interrupting the output of said amplifier and for connecting said modulating source to the input of said modulator, a local oscillator having an input connected to the output of said frequency modulator, the output frequency of said oscillator being frequency modulated in response to the output of said modulator, servo means having its input connectable in series with the output of said amplifier, the output of said servo means also connected to said oscillator to adjust it for the condition of zero direct-current output from said phase detector, means for connecting the output of said local oscillator to the other input of said phase detector, and second means for sequentially interrupting the connection of said local oscillator output to said phase detector input and for connecting said oscillator output to the transmitting means of said transceiver.

References Cited in the file of this patent

UNITED STATES PATENTS

| | | |
|---|---|---|
| 2,332,540 | Travis | Oct. 26, 1943 |
| 2,452,601 | Ranger | Nov. 2, 1948 |
| 2,462,759 | McCoy | Feb. 22, 1949 |
| 2,513,786 | Crosby | July 4, 1950 |
| 2,684,478 | Fox | July 20, 1954 |
| 2,759,100 | Ratcliffe | Aug. 14, 1956 |
| 2,774,872 | Howson | Dec. 18, 1956 |